United States Patent Office 3,345,366
Patented Oct. 3, 1967

3,345,366
SUBSTITUTED 7-ACETYLAMINO
CEPHALOSPORANIC ACIDS
Benjamin Arthur Lewis, Suffern, and Martin Leon Sassiver, Pearl River, N.Y., and Robert Gordon Shepherd, Ridgewood, N.J., assignors to American Cyanamid Company, Stamford, Conn., a corporation of Maine
No Drawing. Filed Feb. 15, 1967, Ser. No. 616,169
10 Claims. (Cl. 260—243)

ABSTRACT OF THE DISCLOSURE

This disclosure describes compounds of the class of 7 - (carboxymethylphenoxyacetylamino)cephalosporanic acids, 7-(carboxamidomethylphenoxyacetylamino)cephalosporanic acids, 7 - (carboxymethylphenylthioacetylamino)cephalosporanic acids and 7-(carboxamidomethylphenylthioacetylamino)cephalosporanic acids; useful as anti-bacterial agents.

Brief summary of the invention

This invention relates to new derivatives of 7-aminocephalosporanic acid and, more particularly, is concerned with novel compounds which may be represented by the following general formula:

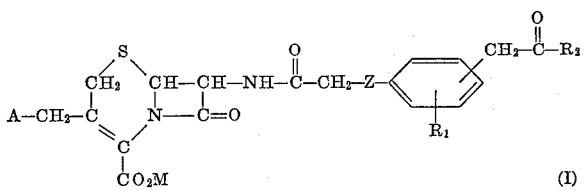

(I)

wherein $R_1$ is hydrogen or chloro, $R_2$ is hydroxy or amino, Z is oxygen or sulfur, A is acetoxy or N-pyridinium, and M is hydrogen, pharmaceutically acceptable non-toxic cations or an anionic charge when A is N-pyridinium.

Detailed description of the invention

In the general Formula (I) set forth above, in those instances where A is N-pyridinium, the cationic charge on this group is matched by the anionic charge of the carboxylic acid radical, the entire molecule being of a zwitterion nature and M is thus an anionic charge. Typical carboxymethyl- or carboxamido-methyl-substituted phenoxyacetyl and phenylthioacetyl groups contemplated by the present invention are p-(carboxymethyl)phenoxyacetyl, m-(carboxymethyl)phenoxyacetyl, p-chloro-o-(carboxymethyl)phenoxyacetyl, p - (carboxymethyl)phenylthioacetyl, o-(carboxymethyl)phenylthioacetyl, p-(carboxamidomethyl)phenoxyacetyl, m - (carboxamidomethyl)phenoxyacetyl, p-chloro-o-(carboxamidomethyl)phenoxyacetyl, p-(carboxamidomethyl)phenylthioacetyl, m-(carboxamidomethyl)phenylthioacetyl, o-(carboxamidomethyl)phenylthioacetyl, and the like.

Also embraced within the scope of the present invention are the non-toxic, pharmaceutically acceptable salts of these derivatives of 7-aminocephalosporanic acid. Included are the monobasic salts when $R_2$ is amino and the dibasic salts when $R_2$ is hydroxy. The cations comprised in these salts and embraced by M include, for example, the non-toxic metal cations such as the sodium ion, potassium ion, calcium ion, magnesium ion, as well as the organic amine cations, such as the tri(lower alkyl)amine cations (e.g., triethylamine), procaine, and the like.

The novel compounds of the present invention, when A is acetoxy in Formula (I) above, may be readily prepared by acylating 7-aminocephalosporanic acid with a compound of the formula:

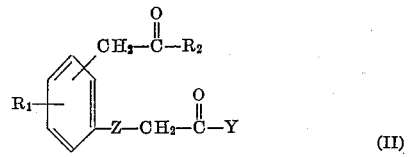

(II)

wherein $R_1$, $R_2$ and Z are as hereinbefore defined and Y is a halide (preferably chloride), azide, acyloxy or p-nitrophenoxy group. This acylation of the 7-aminocephalosporanic acid is performed, for example, by the Schotten-Baumann method, taking into consideration the sensitivity of these compounds, under mild conditions and advantageously in the presence of a diluent or solvent such as water or an organic solvent, for example, a ketone such as acetone, an ether such as tetrahydrofuran, or a halogenated hydrocarbon such as chloroform or methylene chloride. The reaction is preferably conducted in the presence of a basic agent such as sodium bicarbonate or potassium bicarbonate, or an organic base such as one of the organic bases listed hereinbefore. The reaction is also preferably carried out at a temperature of from about 0° C. to about 25° C., preferably at 0° C.–5° C., and over a period of time of a few hours or more. Where $R_2$ is hydroxy, the diacid halide, azide or ester is condensed with 7-aminocephalosporanic acid under conditions to give monoacylation and then hydrolyzed during the work-up and separation of isomers to give the desired product. Removal of other isomers, when formed in appreciable amounts, by chromatographic or crystallization procedures may be readily carried out.

The acylating agents corresponding to Formula (II), when new, may be prepared by methods well known in the art from the corresponding acids (Y is hydroxy). Thus, the acid can be treated with thionyl chloride or oxalyl chloride, if desired in the presence of dimethylformamide, to yield the corresponding acyl chlorides (Y is chlorine), which, if desired, can be converted to the acyl azides (Y is $N_3$) by treatment with sodium azide. The p-nitrophenyl esters (Y is p-nitrophenoxy) can be prepared by following the procedure of Bodanszky et al. (Biochemical Preparations, vol. 9, p. 110, 1962, John Wiley and Sons, New York, N.Y.). Specific acylating agents operable in this process (where $R_2$ is amino) include, for example, p-(carboxamidomethyl)phenoxyacetyl chloride, m-(carboxamidomethyl)phenoxyacetyl chloride, p-chloro-o-(carboxamidomethyl)phenoxyacetyl azide, p-(carboxamidomethyl)phenylthioacetyl chloride, m-(carboxamidomethyl)phenylthioacetyl bromide, p-nitrophenyl p-(carboxamidomethyl)phenylthioacetate, and the like. Specific acylating agents operable in this process (where $R_2$ is hydroxy) include, for example, p-(carboxymethyl) phenoxyacetic acid diacid chloride, m-(carboxymethyl) phenoxyacetic acid diacid chloride, p-chloro-o-(carboxymethyl)phenoxyacetic acid diazide, p-(carboxymethyl) phenylthioacetic acid diacid chloride, m-(carboxymethyl) phenylthioacetic acid diacid bromide, p-chloro-o-(carboxymethyl)phenylthioacetic acid di-p-nitrophenyl ester, and the like. The intermediate corresponding acids (Y is hydroxy) may be readily prepared from the o-, m-, or p-carboxymethyl or o-, m-, or p-carboxamidomethyl phenols or thiophenols by treatment with chloroacetic acid in water or aqueous organic solvents in the presence of NaOH and at a temperature of from about 50° C. to about 100° C. for a period of time of a few hours.

The novel compounds of the present invention, when A is N-pyridinium in Formula (I) above, may be readily prepared from the corresponding 7-aminocephalosporanic acid derivatives (A is acetoxy in Formula (I) above) by treatment with pyridine in water or aqueous acetone at about 20° C. to 50° C. and for a period of time of from about one to about 3 days or more. The resulting 3-(1-pyridylmethyl)-3-cephem-4-carboxylic acid betaines may then be isolated by standard procedures of precipitation and crystallization.

Depending on the reaction conditions used, the new compounds of the present invention are obtained in the free form or in the form of their salts. From the salts it is possible to prepare the acids in known manner, or from the acids the salts are readily accessible, for example, by reaction with hydroxides, carbonates or bicarbonates of alkali metals or alkaline earth metals, or with organic amines.

The novel compounds of the present invention are biologically active and have been found to possess antibacterial activity. As indicated, they are useful antimicrobial agents and have broad-spectrum antimicrobial activity in vitro against standard laboratory microorganisms used to screen for activity against pathogens. The antibacterial spectrum of typical compounds of the present invention, representing the concentration required to inhibit the growth of various typical bacteria, was determined in a standard manner by the agar-dilution streak-plate technique which is commonly used in testing new antibiotics. The following table summarizes the in vitro activity of 7 - [p-(carboxymethyl)phenoxyacetylamino]cephalosporanic acid (1) and 7-[p-(carboxymethyl)phenylthioacetylamino]cephalosporanic acid (2) as compared with Cephalosporin C (3) against a variety of disease-causing microorganisms.

| Organism | Minimal inhibitory conc. (mcg./ml.) | | |
|---|---|---|---|
| | (1) | (2) | (3) |
| Staphylococcus aureus No. 11 | 3.12 | 1.56 | 100 |
| Staphylococcus aureus ATCC 13709 | 0.78 | 0.78 | 50 |
| Streptococcus pyogenes C-203 | 0.39 | 0.39 | 25 |
| Bacillus cereus ATCC 10702 | 0.78 | 0.78 | 100 |
| Salmonella typhosa ATCC 6539 | 1.56 | 0.78 | 12.5 |
| Proteus mirabilis ATCC 9921 | 3.12 | 1.56 | 25 |
| Escherichia coli ATCC 9637 | 50 | 50 | 50 |
| Klebsiella pneumoniae KAD | 1.56 | 3.12 | 25 |
| Shigella shiga | 3.12 | 3.12 | 25 |

The compounds of the present invention retained antibacterial activity after exposure to cephalosporinase, a bacterial enzyme, which completely destroyed the activity of Cephalosporin C under the same conditions.

The high in vitro antibacterial activity of the novel compounds of the present invention makes them useful as additives to materials which are subject to microbial deterioration such as cutting oils and fuel oils. They are also useful in soaps, shampoos and topical compositions for the treatment of wounds and burns.

The invention will be described in greater detail in conjunction with the following specific examples.

EXAMPLE 1

*Preparation of 7-[p-(carboxymethyl)phenoxyacetyl-amino]cephalosporanic acid* p-(Carboxymethyl)phenoxyacetic acid (420 mg. 2 mmole) was converted to its diacid chloride with thionyl chloride. The diacid chloride in acetone (20 ml.) was added to a stirred solution of 7-aminocephalosporanic acid (545 mg. 2 mmole) and sodium bicarbonate (672 mg. 8 mmole) in water (40 ml.) and acetone (20 ml.) which was kept between 0° C. and 5° C. The reaction was stirred for 2 hours at this temperature, and then the acetone was removed under reduced pressure. The aqueous solution was acidified to pH 1 with hydrochloric acid and the mixture extracted with ethyl acetate (3×50 ml.). The ethyl acetate solution was washed with water (100 ml.) and dried over magnesium sulfate. Evaporation of the solvent under reduced pressure gave 642 mg. of 7-[p-(carboxymethyl)phenoxyacetylamino] - cephalosporanic acid. The sodium salt was obtained by slurrying this product in water (10 ml.) and adding 2 N sodium hydroxide dropwise to pH 5 to effect solution. The solution was concentrated to a small volume in a rotary evaporator at 50° C. and the sodium salt was precipitated by the addition of acetone. The precipitate was collected by filtration and dried to give 580 mg. of the disodium salt of 7-[p-(carboxymethyl)phenoxyacetylamino]cephalosporanic acid as an ivory solid.

EXAMPLE 2

*Preparation of 7-[o-(carboxymethyl)phenoxyacetyl-amino]cephalosporanic acid*

By replacing the p-(carboxymethyl)phenoxyacetic acid employed in Example 1 with an equimolecular quantity of o-(carboxymethyl)phenoxyacetic acid and following substantially the same procedure described in Example 1, there is obtained the 7-[o-(carboxymethyl)phenoxyacetylamino]cephalosporanic acid.

EXAMPLE 3

*Preparation of 7-[o-(carboxamidomethyl)phenoxyacetyl-amino]cephalosporanic acid*

The procedure of Example 1 is repeated, substituting an equimolecular amount of o-(carboxamidomethyl)phenoxyacetic acid for the p-(carboxymethyl)phenoxyacetic acid employed in that example. There is thus obtained the 7 - [o - (carboxamidomethyl)phenoxyacetylamino]cephalosporanic acid.

EXAMPLE 4

*Preparation of 7-[p-(carboxymethyl)phenylthio-acetylamino]cephalosporanic acid* p-(Carboxymethyl)phenylthioacetic acid (452 mg. 1 mmole) was converted to its diacid chloride with thionyl chloride. The diacid chloride in acetone (20 ml.) was aded to a stirred solution of 7-aminocephalosporanic acid (545 mg. 2 mmole) and sodium bicarbonate (672 mg. 8 mmole) in water (40 ml.) and acetone (20 ml.) which was kept between 0° C. and 5° C. The reaction was stirred for 2 hours at this temperature, and then the acetone was removed under reduced pressure. The aqueous solution was acidified to pH 1 with hydrochloric acid and the mixture extracted with ethyl acetate (3×50 ml.). The ethyl acetate solution was washed with water (100 ml.) and dried over magnesium sulfate. Evaporation of the solvent under reduced pressure gave 7-[p-(carboxymethyl)phenylthioacetylamino]cephalosporanic acid. The sodium salt was obtained by slurrying this product in water (10 ml.) and adding 2 N sodium hydroxide dropwise to pH 5 to effect solution. The solution was concentrated to a small volume in a rotary evaporator at 50° C. and the sodium salt was precipitated by the addition of acetone. The precipitate was collected by filtration and dried to give 366 mg. of the disodium salt of 7-[p-(carboxymethyl) phenylthioacetylamino] cephalosporanic acid.

EXAMPLE 5

*Preparation of 7-[p-(carboxamidomethyl)phenylthio-acetylamino]cephalosporanic acid*

In place of the p-(carboxymethyl)phenylthioacetic acid of Example 4 there is employed an equimolecular quantity of p-(carboxamidomethyl)phenylthioacetic acid whereby the 7-[p-(carboxamidomethyl)phenylthioacetylamino]cephalosporanic acid is obtained in equally good yield.

EXAMPLE 6

*Preparation of 7-[o-(carboxymethyl)phenylthio-acetylamino]cephalosporanic acid*

In the manner described in Example 4, treatment of 7-aminocephalosporanic acid with the diacid chloride of o-(carboxymethyl)phenylthioacetic acid produces the 7 - [o - (carboxymethyl)phenylthioacetylamino]cephalosporanic acid.

EXAMPLE 7

*Preparation of 7 - [p - (carboxymethyl)phenoxyacetyl-amino]-3-(1 - pyridylmethyl)-3-cephem-4-carboxylic acid betaine*

One gram of the sodium salt of 7-[p-(carboxymethyl)phenoxyacetylamino]cephalosporanic acid and 8 ml. of pyridine was dissolved in 50 ml. of water, which was adjusted to pH 6 with acetic acid, and stored under nitrogen for 3 days at 37° C. The solution was evaporated to dryness and the residue was triturated with acetone to give the product.

EXAMPLE 8

*Preparation of 7 - [p - (carboxamidomethyl)phenylthio-acetylamino]-3-(1-pyridylmethyl)-3-cephem - 4 - carboxylic acid betaine*

One gram of the sodium salt of 7-[p-(carboxamidomethyl)phenylthioacetylamino]cephalosporanic acid and 8 ml. of pyridine was dissolved in 50 ml. of water, which was adjusted to pH 6 with acetic acid, and stored under nitrogen for 3 days at 37° C. The solution was evaporated to dryness and the residue was triturated with acetone to give the product.

EXAMPLE 9

*Preparation of 7-[p-chloro-o-(carboxymethyl)phenoxy-acetylamino]cephalosporanic acid*

In the manner described in Example 1, treatment of 7-aminocephalosporanic acid with the diacid chloride of p-chloro-o-(carboxymethyl)phenoxyacetic acid produces the 7-[p-chloro-o-(carboxymethyl)phenoxyacetylamino] cephalosporanic acid.

What is claimed is:

1. A compound selected from the group consisting of those of the formula:

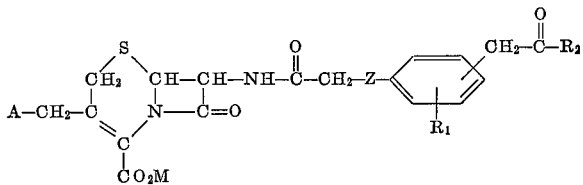

wherein $R_1$ is selected from the group consisting of hydrogen and chloro, $R_2$ is selected from the group consisting of hydroxy and amino, Z is selected from the group consistnig of oxygen and sulfur, A is selected from the group consisting of acetoxy and N-pyridinium, and M is selected from the group consisting of hydrogen, pharmaceutically acceptable non-toxic cations and an anionic charge when A is N-pyridinium; and the non-toxic pharmaceutically acceptable basic salts thereof when $R_2$ is hydroxy.

2. A compound according ot claim 1 wherein $R_1$ is hydrogen, Z is oxygen, A is acetoxy, M is hydrogen, $R_2$ is hydroxy and the carboxymethyl group is in the para-position.

3. A compound according to claim 1 wherein $R_1$ is hydrogen, Z is oxygen, A is N-pyridinium, M is an anionic charge, $R_2$ is hydroxy and the carboxymethyl group is in the para-position.

4. A compound according to claim 1 wherein $R_1$ is hydrogen, Z is sulfur, A is acetoxy, M is hydrogen, $R_2$ is hydroxy and the carboxymethyl group is in the para-position.

5. A compound according to claim 1 wherein $R_1$ is hydrogen, Z is sulfur, A is N-pyridinium, M is an anionic charge, $R_2$ is hydroxy and the carboxymethyl group is in the para-position.

6. A compound according to claim 1 wherein $R_1$ is para-chloro, Z is oxygen, A is acetoxy, M is hydrogen, $R_2$ is hydroxy and the carboxymethyl group is in the ortho-position.

7. A compound according to claim 1 wherein $R_1$ is hydrogen, Z is oxygen, A is acetoxy, M is hydrogen, $R_2$ is amino and the carboxamidomethyl group is in the para-position.

8. A compound according to claim 1 wherein $R_1$ is para-chloro, Z is oxygen, A is N-pyridinium, M is an anionic charge, $R_2$ is amino and the carboxamidomethyl group is in the ortho-position.

9. A compound according to claim 1 wherein $R_1$ is hydrogen, Z is sulfur, A is acetoxy, M is hydrogen, $R_2$ is amino and the carboxamidomethyl group is in the meta-position.

10. A compound according to claim 1 wherein $R_1$ is hydrogen, Z is sulfur, A is N-pyridinium, M is an anionic charge, $R_2$ is amino and the carboxamidomethyl group is in the para-position.

References Cited
UNITED STATES PATENTS 3,167,549  1/1965  Hoover _____ 260—243

NICHOLAS S. RIZZO, *Primary Examiner.*